(12) United States Patent
Scammel

(10) Patent No.: US 8,943,704 B1
(45) Date of Patent: Feb. 3, 2015

(54) APPARATUS FOR LOCATING FIXTURE BOXES AND THE LIKE

(71) Applicant: William Lee Scammel, Dallas, TX (US)

(72) Inventor: William Lee Scammel, Dallas, TX (US)

( * ) Notice: Subject to any disclaimer, the term of this patent is extended or adjusted under 35 U.S.C. 154(b) by 204 days.

(21) Appl. No.: 13/840,216

(22) Filed: Mar. 15, 2013

(51) Int. Cl.
*B25H 7/04* (2006.01)
*H02G 3/10* (2006.01)

(52) U.S. Cl.
CPC ... *H02G 3/10* (2013.01); *B25H 7/04* (2013.01)
USPC .................................. 33/528; 33/666; 33/677

(58) Field of Classification Search
USPC ............. 33/528, 666, 669, 677, DIG. 10, 1 G
See application file for complete search history.

(56) References Cited

U.S. PATENT DOCUMENTS

| | | | | |
|---|---|---|---|---|
| 160,471 A | * | 3/1875 | Robinson | 33/332 |
| 2,526,528 A | * | 10/1950 | Zickler et al. | 33/677 |
| 3,407,509 A | * | 10/1968 | Martinez | 33/666 |
| 3,522,658 A | * | 8/1970 | Howell | 33/528 |
| 4,059,907 A | * | 11/1977 | Dauber | 33/528 |
| 4,363,173 A | * | 12/1982 | Caldera | 33/666 |
| 4,649,652 A | * | 3/1987 | Dickinson et al. | 33/669 |
| 5,598,638 A | * | 2/1997 | Plesh | 33/528 |
| 6,202,313 B1 | * | 3/2001 | Yamashita | 33/286 |
| 6,725,551 B1 | * | 4/2004 | Sutton | 33/286 |
| 7,437,830 B1 | * | 10/2008 | Kulavic | 33/670 |
| 7,454,844 B1 | * | 11/2008 | Ruby | 33/528 |
| 2008/0216335 A1 | * | 9/2008 | Crorey | 33/528 |

* cited by examiner

*Primary Examiner* — Christopher Fulton
(74) *Attorney, Agent, or Firm* — John G. Fischer, Esq.; Paul D. Lein, Esq.; Scheef & Stone, L.L.P.

(57) ABSTRACT

An apparatus for marking the location of fixture and electrical boxes during construction or remodeling of a structure, having a pole with an attached ceiling marking assembly concentrically situated above a marking hole. A spring tensioned bolt is aligned with a ceiling fixture, or a wall marker attached to the side of the pole is aligned to a wall fixture and a mark is made at the base of the apparatus. A level ensures that the pole is properly oriented in a vertical direction. After hanging a rigid covering, such as drywall, the apparatus is aligned in position on top of the previously made floor marking, whereupon the bolt is released via a catch to make a mark on the ceiling drywall where the fixture box is located. Alternatively, the wall markers are used to mark the drywall locations of fixtures located on walls of the structure.

11 Claims, 7 Drawing Sheets

APPARATUS FOR LOCATING FIXTURE BOXES AND THE LIKE

BACKGROUND

This section is intended to introduce the reader to various aspects of art that may be related to various aspects of the presently described embodiments. This discussion is believed to be helpful in providing the reader with background information to facilitate a better understanding of the various aspects of the present embodiments. Accordingly, it should be understood that these statements are to be read in this light, and not as admissions of prior art.

The embodiments described herein relate to an apparatus for locating fixture boxes, utility boxes, and other construction items hidden behind installed drywall during the construction or remodeling of a building or other structure.

In the construction industry, an important part of the process for building a new structure or remodeling an existing one, such as a residential or commercial property is the installation or "hanging" of drywall or sheet rock (also known as plaster board). In the typical building process for a new structure, a crew lays a foundation and another crew assembles a frame for the structure. Generally the frames for interior and exterior walls are made from 2×4, 2×6, or even 2×8 lumber that has been vertically installed as studs with horizontal top plates and sole plates connecting the top and bottom ends of the studs. The roof of the structure may be similarly comprised of a 2×4 lumber frame which makes up joists, rafters, trusses and the like. In other instances, other materials may be used for the frame material, such as steel.

After the frame of the structure has been raised into position, various other steps must be completed prior to installing drywall, such as the installation of exterior walls and roofing. Furthermore, at this stage of the construction process, a plumber will typically install plumbing lines within the gaps created by the frame studs, and connected to water and sewer lines. Similarly, an electrician will install all of the boxes for utility boxes, electrical outlets, ceiling light fixtures, light switches, and the like. The outlet boxes are generally placed 12-16 inches from the floor of the structure and attached to a stud of a wall. Switch boxes may be mounted approximately 50-55 inches from the floor, and also mounted onto a stud. After the boxes are set, the electrician runs wires to connect between the switch boxes and ceiling light fixtures residing in the ceiling of a room. Additional fixtures that may reside in the ceiling or walls of the structure include utility boxes and other types of electrical boxes. These fixtures are scattered throughout the building, and are based off the blueprints and building plans for the specific structure. After installing the various electrical boxes in the ceilings and walls, the electrician will then run wires from the fuse box to the aforementioned electrical boxes as well as additional wires between various boxes.

Once the framing for the structure is completed and the plumbers and electricians have installed necessary plumbing and electrical boxes and cables according to the building plan, the drywall crew may then begin the process of hanging the drywall at a fast rate. Drywall is typically a ½ inch thick layer of plaster or gypsum sandwiched between two thick sheets of paper. A piece of drywall may measure 4 feet in width and 8 or 12 feet in length. The drywall is typically "hung" by a drywall crew by attaching a piece to the studs of the structural frame via screws or nails. The crew continues by hanging drywall in this fashion, taking care to cover all interior surfaces, such as both sides of an interior wall, as well as the ceiling of the structure. After hanging the pieces of drywall, the remaining junctions or gaps between pieces of drywall as well as the heads of the nails and/or screws used to hold the pieces of drywall in place are typically covered up with a smooth putty such as a drywall mud so that when completed, the interior of the structure retains a smooth surface.

For the remodeling of an existing structure, many of the above steps are omitted and, instead, a construction crew may simply tear down or remove existing drywall to be replaced with new drywall.

Whether constructing a new structure or remodeling an existing structure, a common difficulty with the drywalling process is the fact that the newly hung drywall will cover the previously installed electrical boxes and other fixtures. Because the fixture boxes, switch boxes, and outlet boxes are covered up by the drywall during this process, a drywall crew will typically mark the location of the boxes during the hanging process by measuring the distance of the boxes in two directions, such as from the floor and an adjacent frame, or for measuring ceiling fixture locations, from two different walls. The crew then uses the measured distances to make indications on the drywall to be hung as to where the boxes will be behind the drywall once the drywall is hung.

Once the drywall has been hung, a hole is made in the location marked by the crew, which hopefully will be on target in terms of the proper location of an electrical box. After locating the electrical box, a zip tool is used to fully and neatly cut out the portion of the drywall so that the electrical box may be accessed, and the appropriate plugs, switches, and ceiling fixtures may be installed.

A majority of the time, this measuring and locating process provides sufficient accuracy; however, in many instances, the measurement may be off, and a hole may be made in the drywall which is outside the outline of the box, rather than the center of the box. In such cases, another hole must be made, and the damage to the drywall outside the box must be later patched up by another crew member. This thus adds to the time and cost of putting up a structure.

Furthermore, the time it takes for a crew member to measure the distance from each box to a reference point on a floor, ceiling or wall, and then transfer the measurements to a piece of drywall to be hung is itself a time consuming process. In particular, the process for obtaining measurements for ceiling fixtures requires multiple trips using a ladder, further adding to the time required for marking the location of a ceiling fixture on a piece of drywall. This process also increases safety risks due to the use of ladders. Additionally, while the process is generally accurate enough, the instances where a measurement is off results in an incorrect hole being made and additional back end work required to fix the problem.

Thus, there is a need for a more accurate method for marking the location of a fixture or outlet box on a frame behind drywall, and embodiments of the present invention disclosed herein may address one or more of the problems set forth above.

SUMMARY

Certain aspects of some embodiments disclosed herein are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

The apparatus of the present invention is generally related to a vertically upright pole which provides for a simplified yet accurate method of locating fixture and electrical boxes located in the ceiling and walls of a structure after the boxes have been covered up and unseen by a rigid covering such as hung drywall. The apparatus may further be utilized to locate other important objects behind installed drywall, such as plumbing and water lines, as well as mounting points for mounting various items found within a structure. In the description of the invention below, exemplary embodiments are directed toward use of the apparatus primarily for locating electrical boxes in walls and ceilings of a structure.

The apparatus may be used to mark locations of fixtures and electrical boxes prior to drywall being hung, with the apparatus used to make a mark on the floor of the structure, indicating where a fixture or electrical box is located. The apparatus may include a pole that has an attached ceiling marking assembly concentrically situated above a marking hole. The ceiling marking assembly includes a spring tensioned bolt which may be initially aligned with the center of a ceiling fixture during the floor marking process. A level provided on the pole ensures that the pole is properly oriented in a vertical direction. A mark is then made on the floor of the structure via a marking hole aligned with the tensioned bolt.

After the drywall has been hung on the ceiling by a drywall crew, the apparatus is aligned in position on top of the previously made floor markings via the marking hole, whereupon the bolt is released via a catch so that the spring may propel the bolt upwards toward the ceiling to make a mark on the drywall where the fixture box is located. A series of wall markers are similarly provided for marking the location of electrical boxes located in the wall of a structure. The same process of aligning the apparatus to the electrical boxes on the wall via the wall markers and marking the floor via the marking hole is followed. After the drywall is hung on the walls, the apparatus is again aligned with the previously made floor marking and the wall markers used to indicate the position of the electrical boxes on the surface of the drywall. In the case of ceiling fixtures and electrical boxes in the wall, a crew member may then puncture the drywall at the markings indicated, and using a zip tool, cut out the outline of the box for an electrician to complete installation.

The present invention thus provides a simple tool for measuring and subsequently locating the position of utility, electrical, and fixture boxes, as well as any other fixtures or items that may be covered up by the drywalling process. Other uses for the invention may include locating HVAC registers and returns, speaker and other electrical wiring. The invention further eliminates the need to use a tape measure for measuring the location of fixtures and boxes, and reduces the amount of time and labor for accomplishing such tasks. The invention further improves construction safety, as a crew member no longer needs to utilize a ladder to make ceiling measurements. The invention is lightweight and man portable, yet sturdy and durable enough to withstand the rigors of building construction. The invention further provides an all-in-one solution for locating and marking fixtures behind hung drywall, thereby eliminating the number of tools needed for this purpose and further reducing construction and remodeling costs.

Various refinements of the features noted above may exist in relation to various aspects of the present embodiments. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of the embodiments without limitation to the claimed subject matter.

BRIEF DESCRIPTION OF THE DRAWINGS

These and other features, aspects, and advantages of certain embodiments will become better understood when the following detailed description is read with reference to the accompanying drawings in which like characters represent like parts throughout the drawings, wherein.

DETAILED DESCRIPTION OF SPECIFIC EMBODIMENTS

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments, the articles "a," "an" and "the" are intended to mean that there are one or more of the elements. The terms "comprising," "including" and "having" are intended to be inclusive and mean that there may be additional elements other than the listed elements. Moreover, any use of "top," "bottom" "above," "below," other directional terms, and variations of these terms is made for convenience, but does not require any particular orientation of the components.

Figure 1:
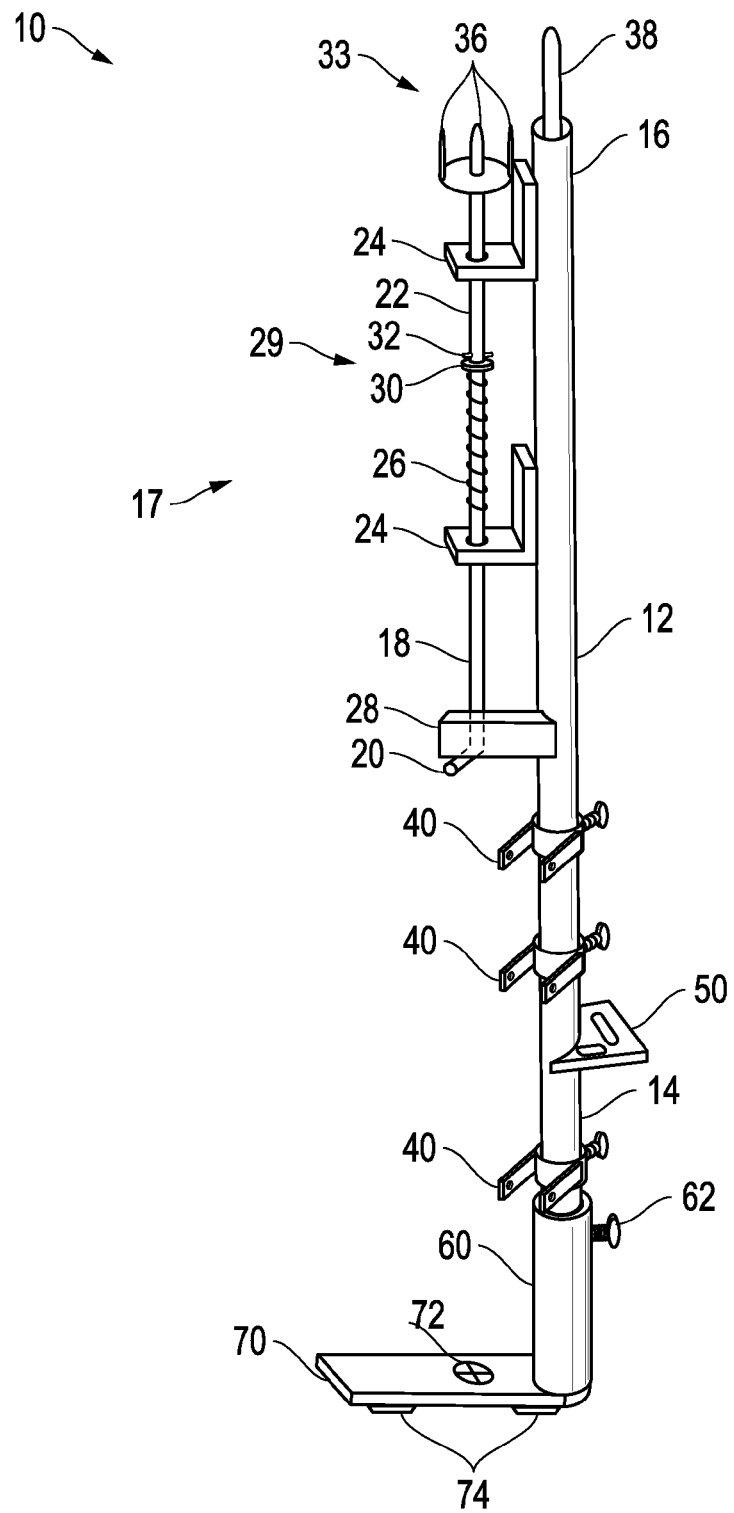
FIG. 1 is a perspective view of the fixture and electrical box locating apparatus of the present invention.

Referring to FIG. 1, a perspective view of an upright apparatus 10 for locating a fixture or electrical box in a wall is shown. The apparatus 10 generally extends in a vertical direction and is comprised of a pole 12 which may be approximately 6-9 feet in length. The pole 12 may be substantially cylindrically shaped and have a first end 14 mounted on a pole extension 60 which provides the pole 12 with height adjustment capability for ceilings of various heights. A height adjustment mechanism 62 securely connects the pole 12 and pole extension 60 while simultaneously providing a series of settings for adjusting the height of the pole 12 relative to the pole extension 60. By adjusting the height of the pole 12 relative to the pole extension 60, the overall apparatus 10 may be adjusted to allow for operation with a variety of ceiling heights. By way of example, the adjustment mechanism 62 may be a thumb screw, a push button, and the like.

The pole extension 60 is mounted on a pole support 70 which may extend outward from the bottom of the apparatus 10. Pole support 70 provides stability and rigidity to apparatus 10 during the marking process, and further provides for a crew member to step on the pole support 70 to further stabilize apparatus 10. One or more slidable pads 74 are located on the bottom side of pole support 70. Slidable pads 74 allow for apparatus 10 to slide along the floor of the structure so as to make it relatively easy for a crew member to accurately move apparatus 10 to the desired location for marking, as well as to move the apparatus to a new location. Slidable pads 74 simultaneously provide sufficient surface tension with the floor so as to not allow apparatus 10 to be too easily movable during use. Further, slidable pads 74 may be made of a material such as plastic or plastic-like materials. Use of this material further prevents scratching of the floor surface such as when apparatus 10 is used for home or office remodeling where preexisting flooring of tile or carpet may already be in place. A marking hole 72 is disposed within the surface of pole support 70, and is essentially a through hole for a crew member to mark the surface of the floor below with a marker or some other tool. Use of the marking hole 72 will be explained in greater detail in conjunction with a ceiling marking assembly 17 below.

Along a second end 16 of pole 12, a ceiling marking assembly 17 is attached to a side of the pole 12. Ceiling marking assembly 17 is comprised of an L-bolt 18 that is held in place via one or more bolt brackets 24. L-bolt 18 is essentially an L-shaped bolt having a first end 20 that includes the shorter leg of the L-shape, along with a second end 22 that includes the longer leg of the L-shaped bolt 18. Bolt brackets 24 include through holes for the L-bolt 18 to be inserted through, and are held onto the side of pole 12 via screws or other attachment mechanisms. L-bolt 18 is further held in place via a spring 26 located between the extents of two bolt brackets 24, with the second end 22 of L-bolt 18 inserted through the central space of spring 26.

At its ends, spring 26 is constrained by lower bolt bracket 24, and a spring retainer 29 attached to L-bolt 18. Spring retainer 29 may be comprised of a spring washer 30 and a washer pin 32 to retainer the upper end of the spring 26. In other embodiments, spring retainer 29 may be comprised of various other assemblies suitable for retaining spring 26. As shown in the present figure, the end of spring 26 is retained by spring washer 30 which itself is held in place by a washer 32 inserted through the body of L-bolt 18. The spring 26 itself may be a metallic coil spring and be strong enough to provide ample striking force for the L-bolt 18. In a preferred embodiment, spring 26 may have a tensioning force of up to 25 lbs. per inch.

In the normal, ready position, L-bolt 18 is pulled downward and locked into place via a catch 28. Catch 28 thus serves to secure the L-bolt 18 in conjunction with spring 26. Catch 28 also serves to store potential energy within spring 26 such that spring 26 will propel L-bolt 18 upward when a crew member releases L-bolt 18 from catch 28.

A marking assembly 33 is located at end 22 of L-bolt 18 for use in marking a spot on a rigid covering, such as drywall hung from the ceiling of a structure. In the embodiment shown, marking assembly 33 may be comprised of a washer 34 and a series of marking pins 36. Washer 34 serves to hold marking pins 36 in place while also providing for a stop of the L-bolt 18 so as to not over-penetrate the drywall material on the ceiling. While the currently illustrated washer 34 is circular in shape, washer 34 may be a variety of shapes sufficient to hold the marking pins 36 while providing a sufficient stop against the drywall located on the ceiling of a structure. Marking pins 36 may include a center pin and one or more edge pins which may be used to further enlarge the markings on the ceiling of the structure. After the L-bolt 18 is released from catch 28, a center marking and additional edge markings are made, whereupon a crew member may rotate the L-bolt 18 to enlarge the markings created by the edge pins.

A spring loaded plunger 38 is located on the second end 16 of pole 16, and is used to further stabilize apparatus 10 during use. For instance, the height of apparatus 10 may be adjusted upward or downward via the height adjustment mechanism 62 until the end 16 of pole 12 is a few inches from touching the ceiling. Spring loaded plunger 38 thus engages the ceiling with plunger 38 which provides a tension to apparatus 10 in conjunction with pole support 70. In this manner, apparatus 10 will be sufficiently stabilized for a crew member to freely release L-bolt 18 to make a mark on the ceiling, as well as making a mark on the floor within the marking hole 72.

A set of height adjustable wall markers 40 are located along the body of pole 12 and allow for a crew member to mark locations of light switch boxes, electrical outlet boxes, and kitchen countertop electrical boxes. A level 50 is further provided to aid the crew member during the marking process.

Figure 2:
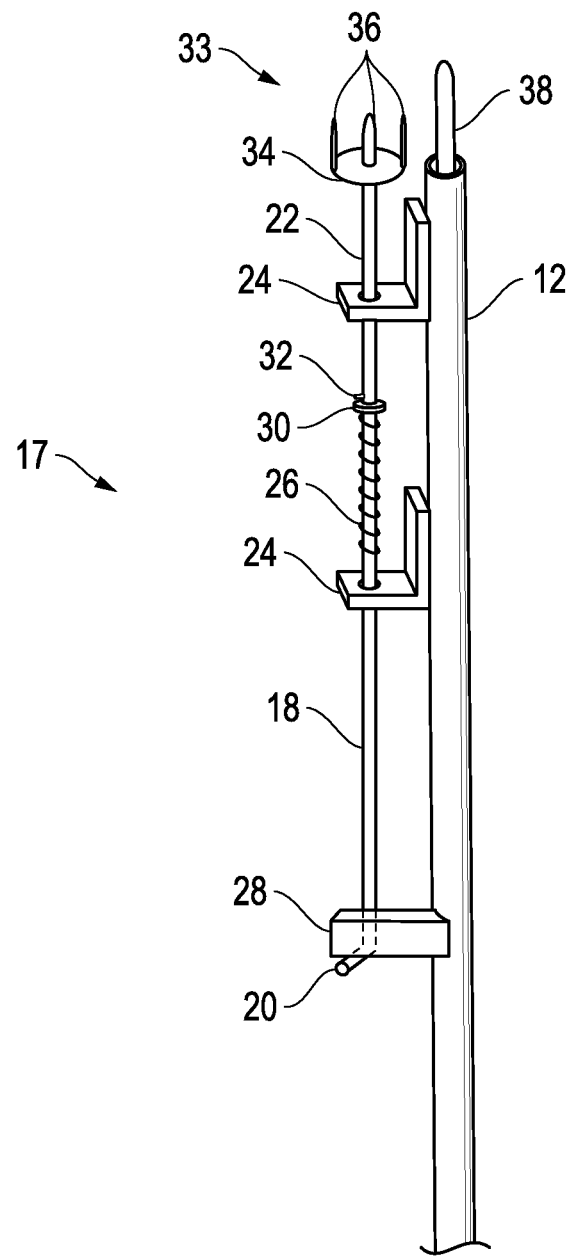
FIG. 2 provides a close up view of the ceiling marking assembly of the apparatus shown in FIG. 1.

Turning now to FIG. 2, a close up view of ceiling marking assembly 17 of apparatus 10 is shown. As substantially described in FIG. 1, ceiling marking assembly 17 is comprised of an L-bolt 18 that is connected to pole 12 via bolt brackets 24. A spring 26 provides tension to the L-bolt 18 such that the L-bolt 18 will spring upward when released from the catch 28. A crew member may thus pull and rotate the end 20 of L-bolt 18 to release the L-bolt 18 from the catch 28. The reverse process may be used to secure the L-bolt 18 back on the catch 28. The process of marking the ceiling will be discussed further below.

Figure 3:
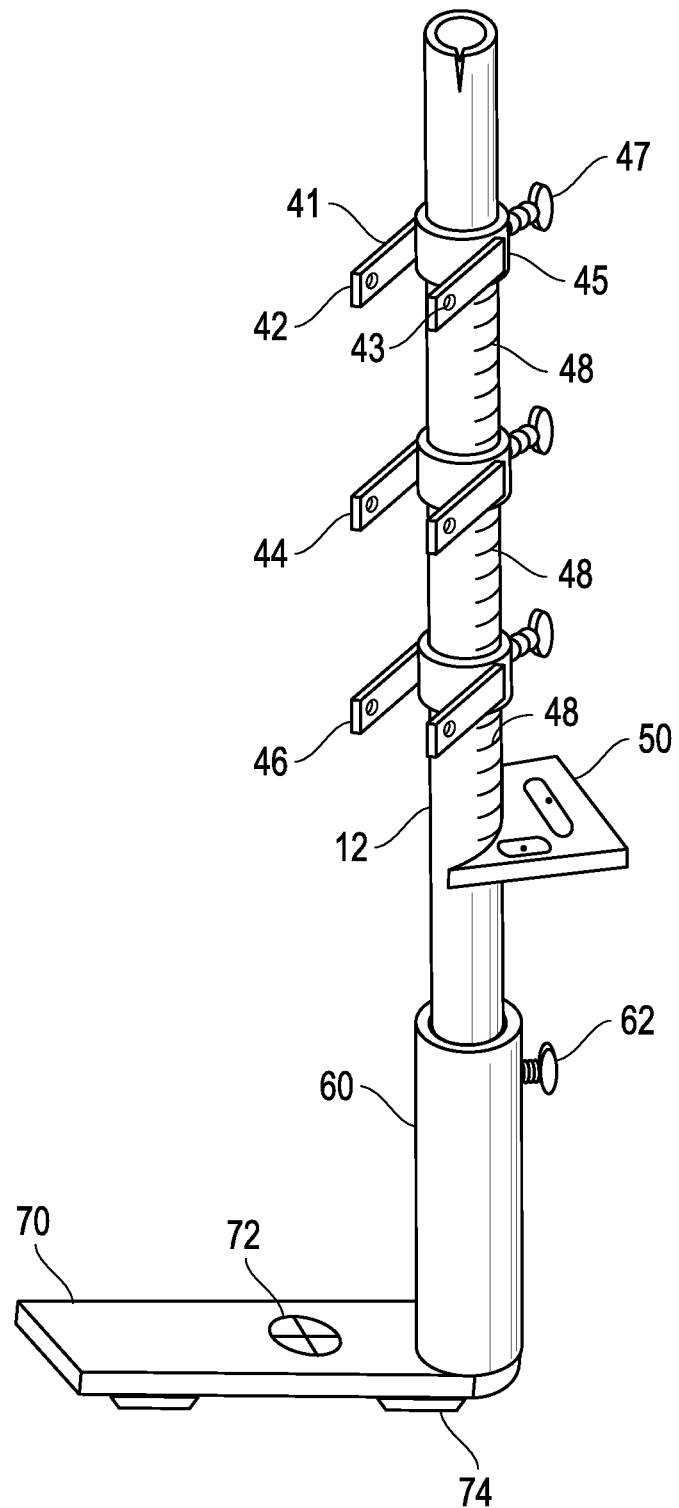
FIG. 3 provides a close up view of the adjustable wall marker and pole extension and support of the apparatus shown in FIG. 1.

Next, at FIG. 3, adjustable wall markers 40 may be seen mounted on the body of pole 12. Markers 40 may be comprised of parallel metal prongs 41 which extend horizontally from pole 12. Prongs 41 each have a through hole 43 located thereon to facilitate aligned insertion of a tool to make a mark on the drywall. The prongs are mounted to the body 12 via a bracket 45 and adjustably held in place by an adjustment mechanism 47 similar to adjustment mechanism 62 located on pole extension 60. By way of example only, adjustment mechanism 47 may be a thumb screw, a push button, and the like. In this manner, the wall markers may be height adjustable upwards or downwards depending on the various configurations and heights of wall mounted electrical boxes located in a particular structure.

The wall markers 40 may be further identified as a switch marker 42, a kitchen outlet marker 44, and a wall outlet marker 46. Switch marker 42 may generally be used to locate light switch boxes which are typically at a height of 50-55 inches from the floor, kitchen outlet marker 44 may generally be used to locate outlets located in a kitchen area or utility room and are typically at a height of approximately 42 inches from the floor, and wall outlet marker 46 may generally be used to locate general wall outlets which are typically located at a height of 12-16 inches from the floor. By providing a plurality of wall markers 40 rather than just a single wall marker 40, apparatus 10 conveniently allows for commonly encountered electrical boxes to be marked and located without having to readjust the wall marker settings, thereby reducing confusion and the likelihood of incorrectly setting the wall markers 40.

The body of pole 12 where the wall markers 40 are mounted may further provide ruler measurements 48 for a crew member to visually ascertain the current height of a particular marker 40 from the ground. By using the ruler measurements 48, a crew member may accurately set the appropriate height of the various wall markers 40 between the initial floor marking step and ceiling/wall marking step.

As seen in the current figure, a level 50 is further provided to ensure accurate placement of apparatus 10 during the marking process as well as further increasing the accuracy of the apparatus for locating electrical and utility boxes located unseen behind mounted drywall. Level 50 may be a standard bubble level and may include a plurality of levels to ensure accurate leveling of apparatus 10. During operation, after apparatus 10 is placed in a desired location, level 50 is checked to ensure that apparatus 10 is oriented vertically or substantially vertically for the floor marking process as well as the wall and ceiling marking process.

Figure 4:
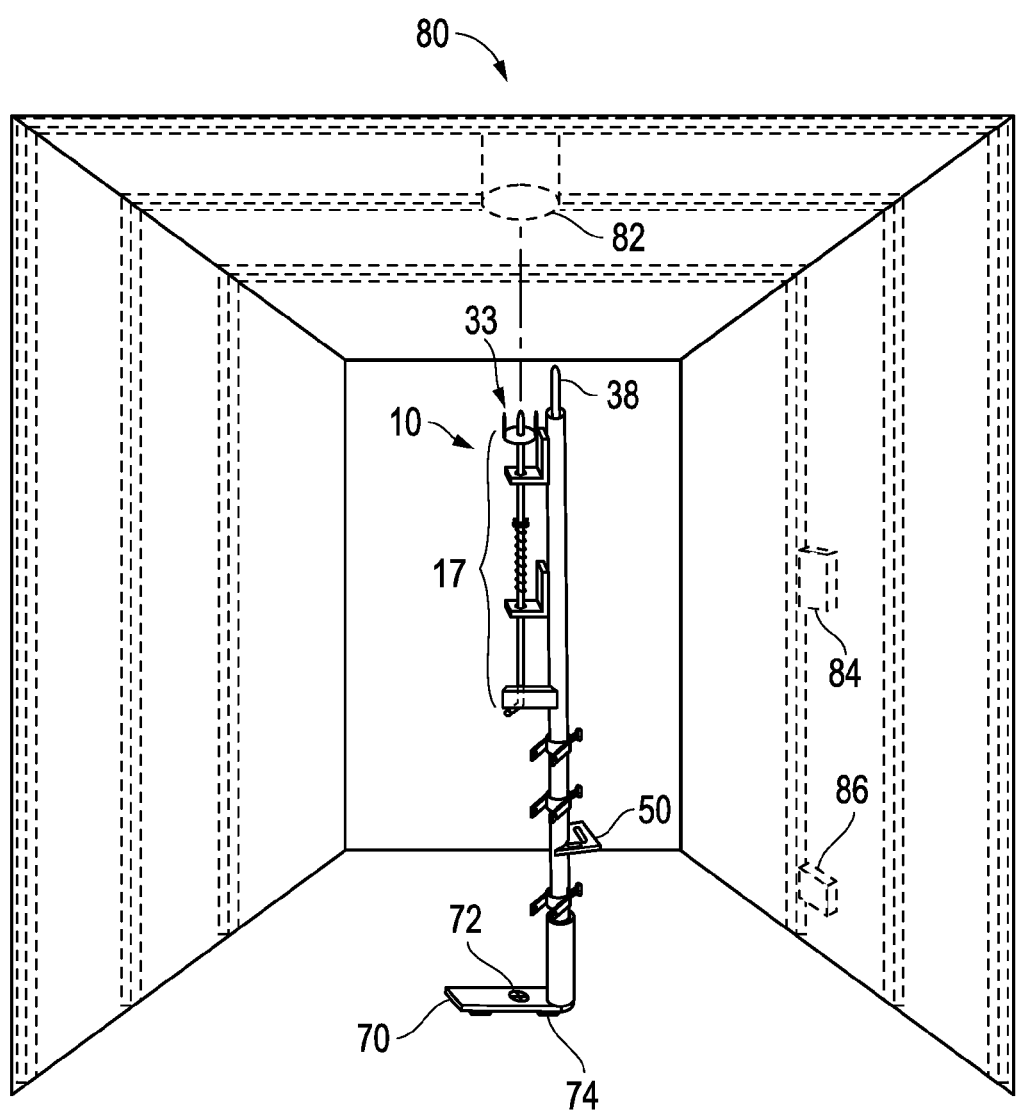
FIG. 4 illustrates the locating apparatus of the present invention used to locate and mark a ceiling fixture in a structure under construction.

Turning to FIG. 4, therein is shown apparatus 10 being used to locate various electrical and utility boxes 80 within a room of a structure. Initially, apparatus 10 may be aligned with a fixture or electrical box located in the ceiling or wall prior to the drywall being hung. For instance, for marking a ceiling fixture, marking pins 36 of marking assembly 33 may be generally aligned with the center of ceiling fixture box 82. A crew member then checks to ensure the apparatus is level via the level 50. After apparatus 10 is leveled, the crew member marks the spot via the marking hole 72 on the pole support 70. A permanent or non-permanent ink marker may be used for this purpose. This marks the center of the fixture box 82 as the marking assembly 33 is aligned with the marking hole 72. During this process, slidable pads 74 and plunger 38 ensure that the apparatus is generally stabilized such that it will not tip or fall over.

Next, after the drywall has been hung on the ceiling, the ceiling fixture box has essentially been covered up and is no longer visible to the crew members. Thus, apparatus 10 is aligned with the previously made floor markings by aligning the marking hole 72 with the previously made mark on the floor. Apparatus 10 is again leveled via the level 50, whereupon the ceiling marking assembly 17 may be used to mark locations on the freshly installed drywall which correspond to the precise location of the ceiling fixture box 82.

Figure 5:
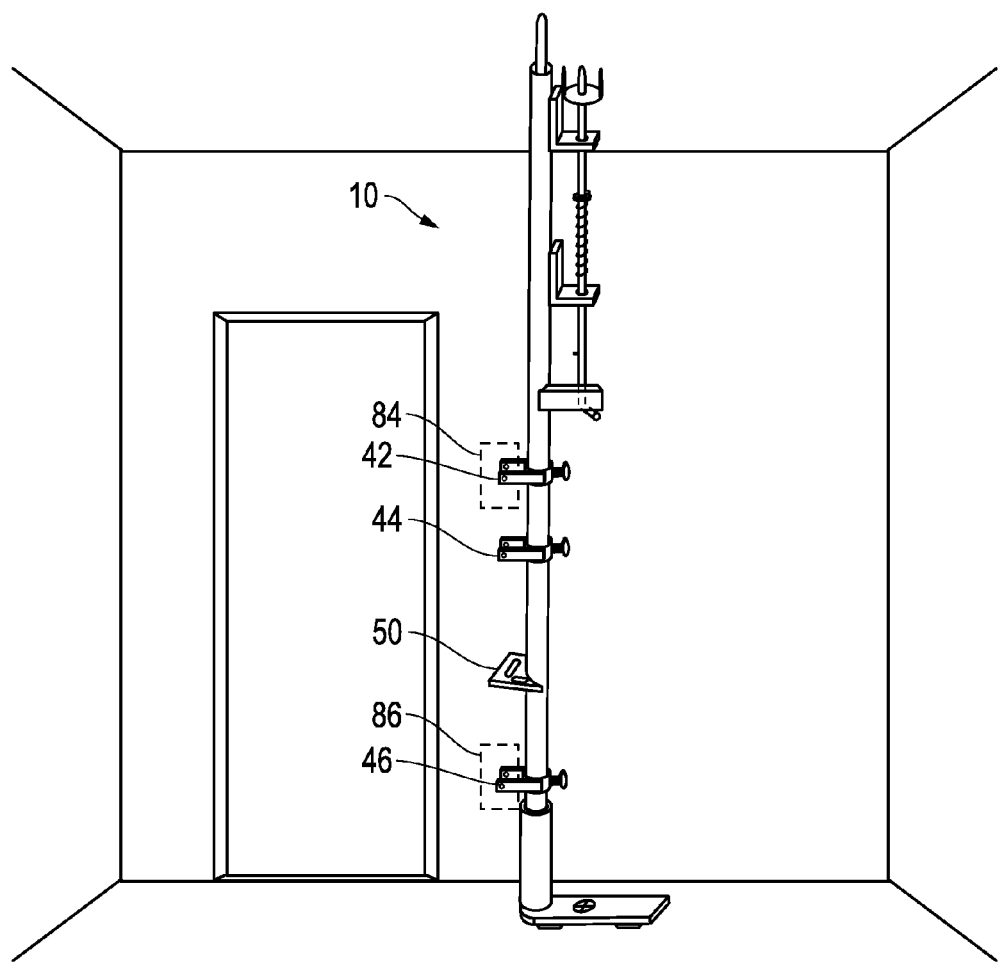
FIG. 5 illustrates the locating apparatus of the present invention used to locate and mark switch and outlet boxes located in the wall of a structure under construction.

Turning to FIG. 5, apparatus 10 is shown locating the positions of electrical boxes 80 located in the wall of a structure. Here it can be seen that switch boxes 84 and outlet boxes 86 may be marked in similar fashion with the ceiling fixture box 82. Apparatus 10 is positioned such that the appropriate wall marker 40 is located next to the electrical box 80. Specifically, switch marker 42 may be located next to switch box 84, and wall outlet marker 46 may be located next to outlet box 86. Ideally, wall markers 40 are aligned such that metal prongs 41 extend flush with and parallel to the wall where electrical boxes 84 and 86 are located. That is, through holes 43 located on metal prongs 41 should be aligned to allow for a puncturing tool such as a pick or a screwdriver to be inserted through the through holes 43 perpendicular to the wall where electrical boxes 84 and 86 are located. As with initial alignment for the ceiling fixture box 82, once the positions of electrical boxes 84 and 86 are aligned with the through holes 43, apparatus 10 is leveled via the level 50, and a marking is made on the floor via the marking hole 72.

Once again, after the drywall has been hung on the walls of the structure, switch and outlet boxes 84, 86 are no longer visible to crew members. Apparatus 10 is then set and aligned at the markings on the floor by centering the marking hole 72 over the mark on the floor next to the wall. Apparatus 10 is again leveled via the level 50. Once aligned and leveled, wall markers 40 may be used to guide a puncturing device such as a pick or screwdriver to punch a hole in the wall corresponding to the location of outlet boxes 84, 86. That is, a tool such as a screwdriver may be threaded through the through holes 43 and into the wall wherein a hole will be made in the wall due to the composition of the drywall. Once a hole is made in the wall, a zip tool may be used to fully cut out the outline of outlet boxes 84, 86 for an electrician to install the remaining components.

Figure 6:
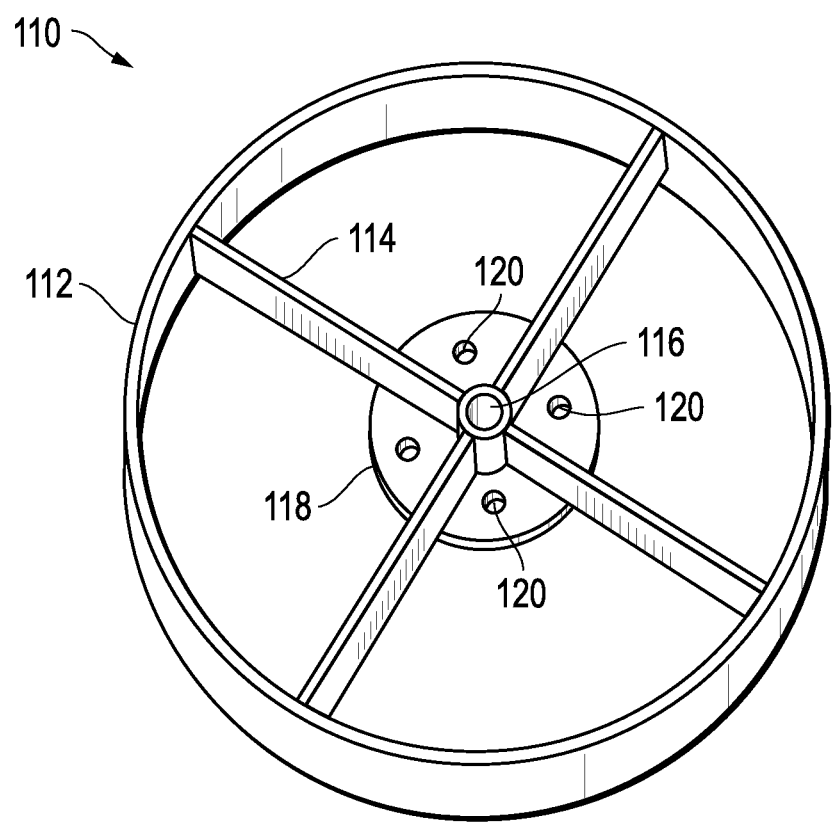
FIG. 6 is a perspective view of a halo attachment for the ceiling marking assembly shown in FIG. 2.

At FIG. 6, a halo attachment 110 for the ceiling marking assembly 17 is shown. Halo attachment 110 may be attached to the ceiling marking assembly 17 when using apparatus 10 to initially mark the floor at the location of a ceiling fixture box 82. Typically, prior to the drywall being hung on the ceiling, ceiling fixture box 82 is simply an open recess extending into the ceiling. Thus, given the relative dimensions of the ceiling marking assembly 17, and particularly the width of the marking washer 34, this would prevent apparatus 10 from being able to be stabilized while initially marking the location of the ceiling fixture box 82 prior to installation of ceiling drywall. The halo attachment 110 therefore may be used to resolve this problem.

The halo attachment 110 may generally be a cylindrically shaped structure having a radius between 3-6 inches, and generally formed from metal or some other suitably hard material. The outer perimeter 112 of halo attachment 110 may be cylindrical in shape for engaging ceiling fixture box 82. In a preferred embodiment, the outer perimeter has a thickness of approximately ¼ inch with a height of approximately ¾ inch. A plurality of spokes 114 extend from the outer perimeter 112 inward toward the center of halo attachment 110. In a preferred embodiment, spokes 114 may share the same thickness and height with the outer perimeter 112. Spokes 114 extend and connect to a central marking pin recess 116, which has a thickness and height that is substantially the same as the spokes 114 and outer perimeter 112. A plate 118 is attached to the bottom of halo attachment 110 and is concentric with the center of halo attachment 110. Plate 118 further includes a circular hole in the center which is aligned with and of the same diameter as the central marking pin recess 116. A series of marking pin holes 120 are deposited in the surface of plate 118 and, together with central marking pin recess 116, correspond to the locations of marking pins 36 located on the top of marking assembly 33.

To use the halo attachment 110, plate 118 may simply be placed on top of marking assembly 33 of ceiling marking assembly 17, with the marking pin recess 116 and marking pin holes 120 aligned with the marking pins 36 of marking assembly 33. Halo attachment 110 may then be secured to the marking assembly 33 via screws and nuts. This creates a secure connection between the halo attachment and the ceiling marking assembly 17. Apparatus 10 is then utilized as described above to obtain the correct location of ceiling fixture box 82, with the outer perimeter 112 and spokes 114 engaging the edges or border of the ceiling fixture box 82, thereby creating a tension between the ceiling fixture box 82 and the overall apparatus 10. In this fashion, apparatus 10 remains stable while the crew member marks the location of apparatus 10 on the floor of the structure. Afterwards, drywall is hung on the ceiling of the structure, and halo attachment 110 may be removed so that apparatus 10 may be used to mark the ceiling as described above.

Figure 7:
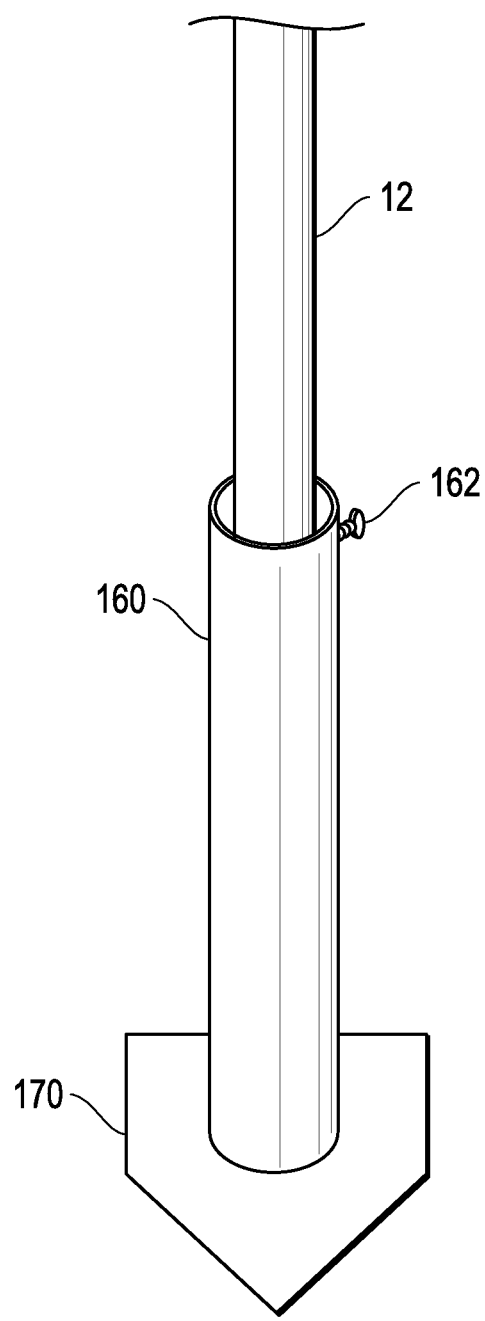
FIG. 7 is a perspective view of an alternative embodiment of the pole extension and support shown in FIG. 3.

FIG. 7 is a perspective view of an alternative embodiment of the pole support shown in FIG. 3. In this figure, pole extension 60 again provides pole 12 with height adjustment capability for ceilings of various heights. However, rather than attachment to the pole support 70 as shown in FIG. 3, the pole extension 60 is now attached to an alternative embodiment of pole support 170. Pole support 170 does not have a marking hole 72; but instead relies upon the crew member or operator to simply use an ink-based marker to make an outline of the pole support 170 directly on the floor of the structure. Because pole support 170 has a non-equiangular shaped outline, there is only a single alignment position for the pole support 170. In other words, after marking the outline of pole support 170 hanging drywall on either the ceiling or floor of the structure, apparatus 10 will be placed in the exact same location and aligned position as before by simply matching up the pole support 170 with the previously drawn outline on the floor.

Advantages of pole support 170 include an even more simplistic method for marking the position of the apparatus 10 during use. Further, the design of the pole support 170 adds extra stability to the overall apparatus 10 during use.

Thus, the advantages of the present invention include the ability to accurately mark fixture and electrical box locations during the building or remodeling of a structure while significantly decreasing the amount of time required to measure and mark the locations of such fixture boxes. Additionally, the present invention may be utilized to measure and locate other fixtures or items that may be covered up by the drywalling process, such as HVAC registers or plumbing and water lines. The invention eliminates the need to use a tape measure for measuring the location of fixtures and boxes, thereby reducing the amount of time and labor for accomplishing such tasks. The invention further improves construction safety, as a crew member no longer needs to utilize a ladder to make ceiling measurements, but instead makes a mark on the floor. The invention is lightweight for easy handling by a single person, yet sturdy and durable enough to withstand the rigors of building construction.

While the aspects of the present disclosure may be susceptible to various modifications and alternative forms, specific embodiments have been shown by way of example in the drawings and have been described in detail herein. But it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. An apparatus for locating a concealed utility box behind a piece of drywall comprising:
   an elongated pole having a pole extension attached to the bottom end thereto;
   a pole support extending outward from a side of the pole extension, the pole support having a marking hole located on a surface thereto;
   a bracket assembly attached to a side of the cylindrical rod on an end of the rod opposite the base section;
   a bolt extending in a direction parallel to the elongated pole and held by the bracket assembly;
   a spring concentric with the bolt assembly, the spring tensioning the bolt via a releasable catch attached to the pole;
   a marking assembly on an end of the bolt opposite the catch;
   a level attached to the elongated pole; and,
   wherein the bolt is substantially concentric with the marking hole.

2. The apparatus of claim 1, further comprising:
   a plurality of adjustable wall markers.

3. The apparatus of claim 2, the plurality of adjustable wall markers further comprising:
   one or more metal prongs extending outward horizontally from the elongated pole; and,
   an adjustment mechanism for adjusting the height of the wall markers.

4. The apparatus of claim 2, the plurality of adjustable wall markers further comprising:
   a switch box wall marker; and,
   an outlet box wall marker.

5. The apparatus of claim 2, further comprising:
   the level located adjacent to one of the plurality of adjustable wall markers.

6. The apparatus of claim 1, further comprising:
   a spring loaded plunger located in the top end of the elongated pole.

7. The apparatus of claim 1, further comprising:
   the pole support having a height adjustment mechanism for providing height adjustment capability to the elongated pole.

8. The apparatus of claim 1, further comprising:
   one or more slidable pads attached to a bottom side of the pole support.

9. The apparatus of claim 1, further comprising:
   a halo attachment for removable connection to the marking assembly, the halo attachment for stabilizing the apparatus during marking of a ceiling fixture.

10. The apparatus of claim 1, further comprising:
    the pole support having a non-equiangular shaped outline.

11. A method for locating a ceiling fixture, comprising the steps of:
    locating a ceiling fixture within a structure and placing a fixture locating apparatus directly below the ceiling fixture prior to the installation of a rigid covering on the ceiling;
    marking the floor of the structure at a point aligned with a vertical axis of the marking apparatus;
    installing the rigid covering on the ceiling such that the ceiling fixture is no longer visible;
    aligning the locating apparatus on the previously made marking on the floor; and,
    engaging a marking mechanism on the locating apparatus at a point on the rigid covering that is substantially centered below the ceiling fixture.

* * * * *